United States Patent
Heinberg (10) Patent No.: US 9,270,760 B2
(45) Date of Patent: Feb. 23, 2016

(54) CROSS-PLATFORM CHILD MODE FOR APPLICATIONS

(71) Applicant: Google Inc., Mountain View, CA (US)

(72) Inventor: Jonathan Adam Heinberg, Brooklyn, NY (US)

(73) Assignee: Google Inc., Mountain View, CA (US)

(*) Notice: Subject to any disclaimer, the term of this patent is extended or adjusted under 35 U.S.C. 154(b) by 246 days.

(21) Appl. No.: 13/652,391

(22) Filed: Oct. 15, 2012

(65) Prior Publication Data
US 2015/0207853 A1 Jul. 23, 2015

(51) Int. Cl.
*H04L 29/08* (2006.01)
*H04L 29/06* (2006.01)

(52) U.S. Cl.
CPC ............ *H04L 67/14* (2013.01); *H04L 29/0653* (2013.01); *H04L 67/02* (2013.01); *H04L 67/42* (2013.01); *H04L 29/06183* (2013.01); *H04L 29/06319* (2013.01)

(58) Field of Classification Search
CPC ....... G06Q 30/00; G06F 15/16; G06F 15/177; G06F 13/00; G06F 15/00; G06F 17/00; G06F 17/30; G06F 17/30011–17/30017; G06F 17/30058; G06F 17/30861–17/30867; H04K 1/00; H04N 7/16; H04N 1/00; H04N 1/0035; H04N 1/00501–1/00517; H04N 21/00; H04N 21/20; H04N 21/40; H04W 28/08; H04L 29/00; H04L 29/02; H04L 29/06183; H04L 29/06306; H04L 29/06312; H04L 29/06319; H04L 29/06353–29/06367; H04L 29/0653; H04L 29/06537; H04L 29/06823–29/0685; H04L 29/08576; H04L 67/00–67/025; H04L 67/10; H04L 67/14; H04L 67/146; H04L 67/30; H04L 67/306; H04L 67/42

USPC ................... 709/201–203, 223–226; 725/25
See application file for complete search history.

(56) References Cited

U.S. PATENT DOCUMENTS

| | | | | |
|---|---|---|---|---|
| 5,845,260 A * | 12/1998 | Nakano et al. | ................. | 705/17 |
| 6,330,610 B1 * | 12/2001 | Docter et al. | ................. | 709/229 |
| 6,336,117 B1 * | 1/2002 | Massarani | ..................... | 707/711 |
| 6,510,458 B1 * | 1/2003 | Berstis et al. | ................. | 709/219 |
| 6,564,327 B1 * | 5/2003 | Klensin et al. | ..................... | 726/7 |
| 6,637,029 B1 * | 10/2003 | Maissel et al. | ................. | 725/46 |
| 6,643,715 B1 * | 11/2003 | Arthur | ........................... | 710/14 |
| 6,760,748 B1 * | 7/2004 | Hakim | ........................ | 709/204 |

(Continued)

OTHER PUBLICATIONS

Ajax Introduction, w3schools.com, Mar. 30, 2010.*

*Primary Examiner* — Brian J Gillis
*Assistant Examiner* — Boris Grijalva Lobos
(74) *Attorney, Agent, or Firm* — McDermott Will & Emery LLP (57) ABSTRACT

A system and machine-implemented method for processing data associated with an application running on an electronic device. A server receives an HTTP header from the electronic device. The HTTP header is associated with an application running on the electronic device and specifies a content mode for the application. The content mode identifies a type of server content for a user of the application, and corresponds to at least one of plural modes including a child mode in which the type of server content is for a child user. The server receives a request for content from the electronic device, the request being associated with the application, and accesses content for the application based on the received request. The accessed content is provided for the application running on the electronic device. At least one of the accessing or the providing is based on the identified type of server content.

18 Claims, 6 Drawing Sheets

(56) References Cited

U.S. PATENT DOCUMENTS

| | | | |
|---|---|---|---|
| 7,146,505 B1* | 12/2006 | Harada et al. | 713/185 |
| 7,437,772 B1* | 10/2008 | Thenthiruperai et al. | 726/30 |
| 7,444,518 B1* | 10/2008 | Dharmarajan et al. | 713/185 |
| 7,983,961 B1* | 7/2011 | Chang et al. | 705/26.7 |
| 8,024,753 B1* | 9/2011 | Kummer et al. | 725/28 |
| 8,255,411 B1* | 8/2012 | Carpenter et al. | 707/764 |
| 8,312,485 B2* | 11/2012 | Robson et al. | 725/28 |
| 8,503,984 B2* | 8/2013 | Winbush, III | 455/414.1 |
| 8,825,962 B1* | 9/2014 | Zhu et al. | 711/145 |
| 8,959,190 B2* | 2/2015 | Kiley et al. | 709/220 |
| 2001/0042049 A1* | 11/2001 | Zucker et al. | 705/55 |
| 2002/0010798 A1* | 1/2002 | Ben-Shaul et al. | 709/247 |
| 2002/0033844 A1 | 3/2002 | Levy et al. | |
| 2003/0225836 A1* | 12/2003 | Lee et al. | 709/205 |
| 2004/0015714 A1* | 1/2004 | Abraham et al. | 713/200 |
| 2004/0158630 A1* | 8/2004 | Chang et al. | 709/224 |
| 2004/0255137 A1* | 12/2004 | Ying | 713/193 |
| 2005/0028191 A1* | 2/2005 | Sullivan et al. | 725/28 |
| 2007/0050708 A1* | 3/2007 | Gupta et al. | 715/513 |
| 2008/0004984 A1 | 1/2008 | Sendo et al. | |
| 2008/0189360 A1* | 8/2008 | Kiley et al. | 709/203 |
| 2009/0164484 A1* | 6/2009 | Horowitz et al. | 707/100 |
| 2009/0307310 A1* | 12/2009 | Kim et al. | 709/203 |
| 2010/0017843 A1* | 1/2010 | Hilerio et al. | 726/1 |
| 2010/0031283 A1* | 2/2010 | Kageyama et al. | 725/25 |
| 2010/0268758 A1* | 10/2010 | Boykin et al. | 709/203 |
| 2011/0154385 A1* | 6/2011 | Price et al. | 725/12 |
| 2011/0178973 A1* | 7/2011 | Lopez et al. | 706/48 |
| 2011/0208801 A1* | 8/2011 | Thorkelsson et al. | 709/203 |
| 2011/0265169 A1* | 10/2011 | Bauer-Hermann et al. | 726/7 |
| 2012/0278875 A1* | 11/2012 | Kissinger et al. | 726/7 |
| 2012/0297460 A1* | 11/2012 | Brown et al. | 726/4 |
| 2013/0174100 A1* | 7/2013 | Seymour et al. | 715/863 |
| 2013/0325935 A1* | 12/2013 | Kiley et al. | 709/203 |
| 2014/0105103 A1* | 4/2014 | Nethi et al. | 370/328 |

* cited by examiner

CROSS-PLATFORM CHILD MODE FOR APPLICATIONS

BACKGROUND

The present disclosure generally relates to client-server applications and, in particular, to providing a cross-platform child mode for applications.

An end user of an electronic device can access content from a server, for example, via a web browser or other application on the electronic device. In some cases, content or functionality provided by the server is not appropriate or suitable for the end user.

SUMMARY

The disclosed subject matter relates to a machine-implemented method of processing data associated with an application running on an electronic device. The method comprises receiving, at a server, an HTTP header from an electronic device, wherein the HTTP header is associated with an application running on the electronic device and specifies a content mode for the application, the content mode identifying a type of server content for a user of the application, the content mode corresponding to at least one of plural modes including a child mode in which the type of server content is for a child user. The method further comprises receiving, at the server, a request for content from the electronic device, the request being associated with the application, and accessing, at the server, content for the application based on the received request. In addition, the method comprises providing the accessed content for the application running on the electronic device, wherein at least one of the accessing or the providing is based on the type of server content identified by the content mode.

The disclosed subject matter further relates to a system for processing data associated with an application running on an electronic device. The system comprises one or more processors, and a machine-readable medium comprising instructions stored therein, which when executed by the processors, cause the processors to perform operations comprising receiving, at a server, an HTTP header from an electronic device, wherein the HTTP header is associated with an application running on the electronic device and indicates a user interaction mode for the application, the user interaction mode identifying a type of user interaction for a user of the application, the user interaction mode corresponding to at least one of plural modes including a child mode in which the type of user interaction is for a child user. The operations further comprise receiving, at the server, an indication of user input from the electronic device, the user input being associated with the application, and providing, in response to the received indication of user input, for interaction in the application based on the type of user interaction identified by the user interaction mode.

The disclosed subject matter also relates to machine-readable medium comprising instructions stored therein, which when executed by a system, cause the system to perform operations comprising sending, by an electronic device, an HTTP header to a server, wherein the HTTP header is associated with an application running on the electronic device and indicates at least one of a content mode or a user interaction mode for the application, wherein the content mode identifies a type of server content for a user of the application, and corresponds to at least one of plural modes including a child mode in which the type of server content is for a child user, and wherein the user interaction mode identifies a type of user interaction for the user of the application, and corresponds to at least one of the plural modes including the child mode in which the type of user interaction is for the child user. The operations further comprise sending, by the electronic device, at least one of a request for content or an indication of user input to the server, the request or the indication of user input being associated with the application. In addition, the operations comprise receiving, from the server, in response to the sent request or indication of user input, at least one of content for the application based on the type of server content identified by the content mode, or instructions for interaction in the application based on the type of user interaction identified by the user interaction mode.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

An end user of an electronic device can access content from a server, for example, via a web browser or other application on the electronic device. In some cases, it may be desirable for the content from the server to be specific to type of user. For example, if the user is a child, it may be desirable for content from the server to be appropriate for children.

The subject technology provides for processing data associated with an application running on an electronic device. A server receives an HTTP header from the electronic device. The HTTP header is associated with an application running on the electronic device and specifies a content mode for the application. The content mode identifies a type of server content for a user of the application, and corresponds to at least one of plural modes including a child mode in which the type of server content is for a child user. The server receives a request for content from the electronic device, the request being associated with the application, and accesses content for the application based on the received request. The accessed content is provided for the application running on the electronic device. At least one of the accessing or the providing is based on the identified type of server content.

In example aspects, the HTTP header indicates a user interaction mode for the application, the user interaction mode identifying a type of user interaction for a user of the application, the user interaction mode corresponding to at least one of plural modes including a child mode in which the type of user interaction is for a child user. The server receives an indication of user input from the electronic device, the user input being associated with the application. In response to the received indication of user input, interaction in the application is provided based on the type of user interaction identified by the user interaction mode.

Figure 1:
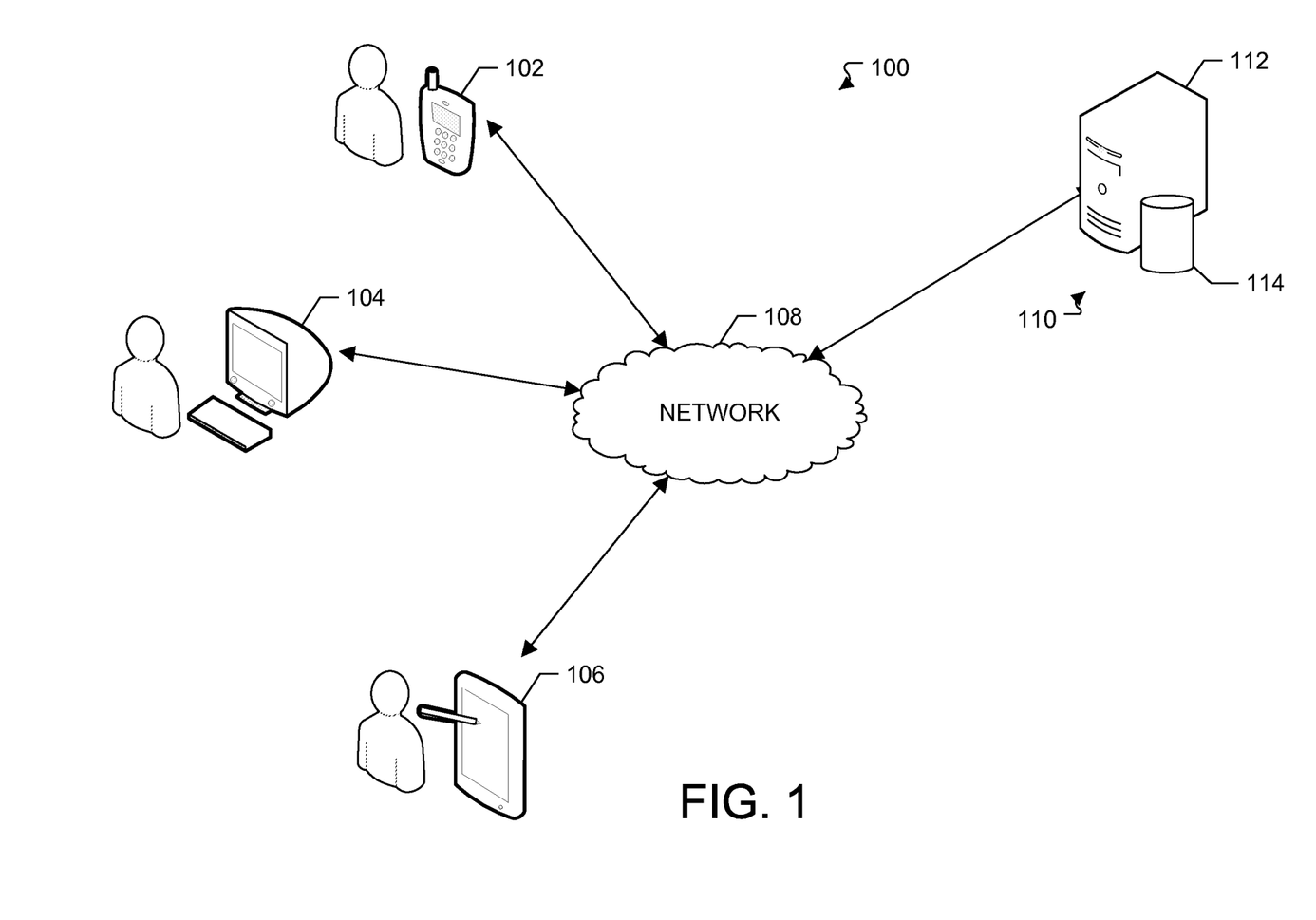
FIG. 1 illustrates an example network environment which provides for processing data associated with an application running on an electronic device.

FIG. 1 illustrates an example network environment which provides for processing data associated with an application running on an electronic device. A network environment 100 includes computing devices 102, 104 and 106 and computing system 110. Computing devices 102-106 and computing system 110 can communicate with each other through a network 108. Computing system 110 can include one or more computing devices 112 one or more servers), respectively, and one or more computer-readable storage devices 114 (e.g., one or more databases), respectively.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a BLUETOOTH™ transceiver, WI-FI™ transceiver, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, processing device 112 executes computer instructions stored in data store 114, for example, to process data associated with an application running on any of electronic device 102-106. For example, server 110 receives an HTTP header from the electronic device (e.g., 102-106). The HTTP header is associated with the application running on the electronic device and indicates a content mode for the application. The content mode identifies a type of server content for a user of the application, and corresponds to at least one of plural modes including a child mode in which the type of server content is for a child user. Server 110 receives a request for content from the electronic device (e.g., 102-106), the request being associated with the application. Server 110 accesses content for the application based on the received request. Server 110 provides the accessed content for the application running on the electronic device 102-106). At least one of the accessing or the providing is based on the type of server content identified by the content mode.

In another example, the header received by server 110 from the electronic device (e.g., 102-106) indicates a user interaction mode for the application. The user interaction mode identifies a type of user interaction for a user of the application, and corresponds to at least one of plural modes including a child mode in which the type of user interaction is for a child user. Server 110 receives an indication of user input from the electronic device (e.g., 102-106), the user input being associated with the application. Server 110 provides, in response to the received indication of user input, for interaction in the application based on the type of user interaction identified by the user interaction mode.

Figure 2:
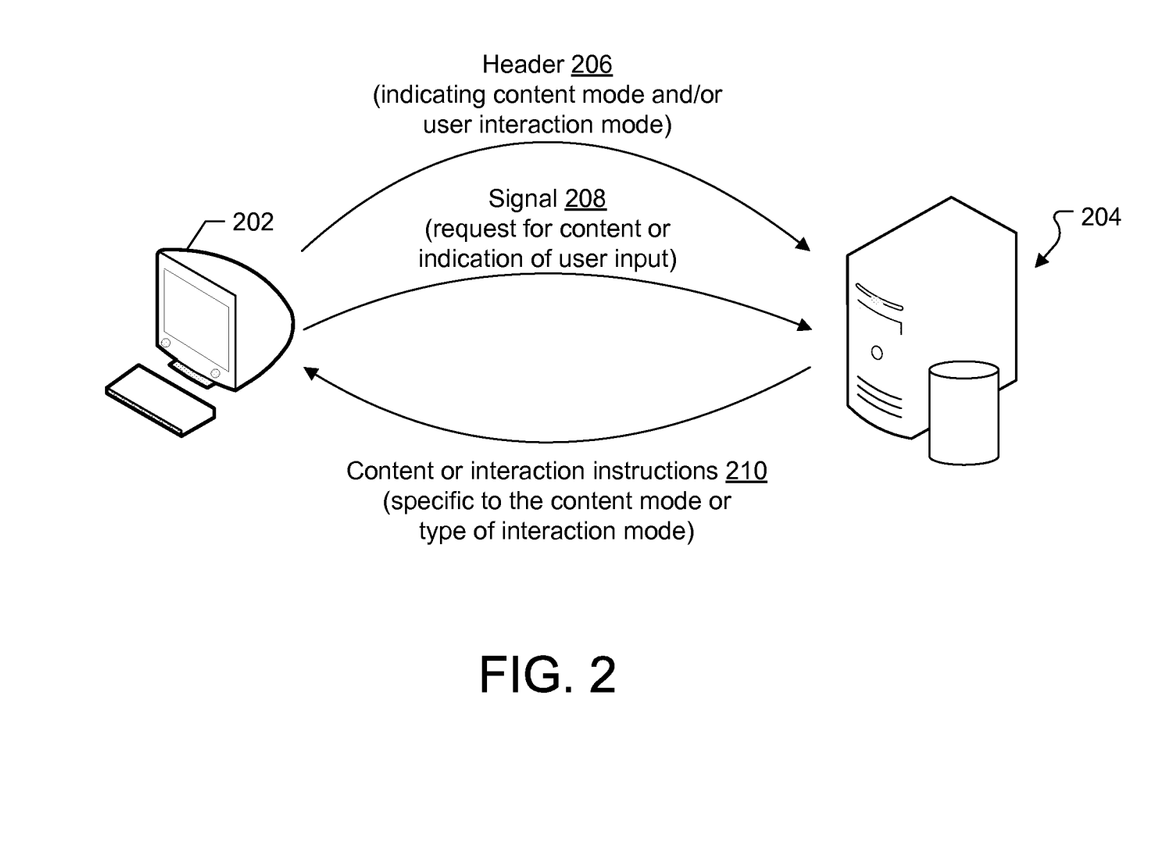
FIG. 2 illustrates an example of communication between an electronic device and a server, for processing data associated with an application running on the electronic device.

FIG. 2 illustrates an example of communication between an electronic device and a server, for processing data associated with an application running on the electronic device. In the example of FIG. 2, an electronic device 202 (e.g., corresponding to any of electronic devices 102-106) communicates with a server 204 (e.g., corresponding to server 110) over a network (e.g., network 108). For example, the application running on electronic device 202 can be web browser, a client-side application, or an operating system running on the electronic device. Further, electronic device 202 can specify a content mode and/or a user interaction mode for one or more applications (e.g., a web browser, a client-side application, or an operating system) running on electronic device 202.

In this regard, the content mode identifies a type of server content (e.g., content for a child, content for a user who is not a child) for a user of the application. For example, a child mode indicates that server content should be restricted to content or material (e.g., suggested ads or links) which is appropriate for children. Content which is not appropriate for a child, such as obscenity, violence, or other content intended for an adult audience, should be filtered out. On the other hand, a non-child mode may indicate no (or less) restrictions on server content, and can allow for material (e.g., suggested ads or links) which is not suitable for children. In example aspects, the non-child mode may indicate that content intended for children be filtered or reduced, since such material may not be as relevant or appropriate for an adult user of the application.

Of course, the filtering of content for child and non-child users is one example of different content modes, and other content modes can be provided or filtered for different types of users (e.g., age groups spread across more than two groupings, or other groupings besides age, including, but not limited to interest groups). The server providing content can correspond to any online service, including but not limited to, a social networking service, a search engine, an ecommerce site, a content site (e.g., a news website, a video-sharing website), a forum site or a blog.

In addition to the content mode, the user interaction mode identifies a type of user interaction (e.g., interactions for a child user the application, or interactions for a non-child user). Types of user interaction in a child mode may include interface features which are directed to children. For example, in a case where a user is watching a video from a video-sharing service, touching the screen on a touchscreen device may normally pause video playback. However, if a child mode is selected for the touchscreen device, this can be a signal to the video-sharing service not to pause the video, and rather to continue playing the video. For a child user, the ability to pause may be limited to clicking on a pause button within the application playing the video. If a non-child mode is selected, pausing can be effected by either pressing the pause button or otherwise touching the screen. Of course, the pausing of a video based on touch input is one example of handling user interaction modes, and other user interface enhancements or adjustments can be performed. For example, different user interfaces/interactions can be employed for social networking service, a search engine, an ecommerce site, a content site (e.g., a news website, a video-sharing website), a forum site or a blog, based on the type of user specified by the mode.

The content and/or user interaction mode can be a user-specified mode, specified by the user of electronic device 202. For example, the mode can be a setting within a web browser, or can be an operating system setting for electronic device 202. The content mode can be suggested, or automatically selected, to a user of electronic device 202. In example aspects, the content mode can be suggested (e.g., via a prompt dialog) or automatically selected based on user interaction (e.g., browsing history of the user) on electronic device 202. For example, if the user frequently visits websites specific to children, a suggestion (e.g., in the form of a prompt dialog) can be made to set the web browser/operating system to a child mode. Alternatively, the browser/operating system can automatically be set to the child mode.

As can be seen in FIG. 2, electronic device 202 sends a header 206 to server 204, and server 204 receives this header. Header 204 indicates the content mode and/or the user interaction mode for the application running on electronic device 202. Header 204 can be an HTTP header. The HTTP header can be an original type of header which is defined to specify one or more content modes (or user interaction modes). Alternatively, the HTTP header can be any existing type of header which is modified to indicate one or more content modes (or user interaction modes).

In example aspects, header 206 can correspond to an AJAX call. For example, if the application running on electronic device 202 is a web browser, and content for a website provided by server 204 has already been loaded, an AJAX call can be made to specify future content and/or user interaction to be provided by the website by server 204.

Electronic device 202 also sends a signal 208 to server 204, and server 204 receives this signal. Signal 208 corresponds to a request for content and/or an indication of user input to server 204. Signal 208 is associated with the application. For example, if the application running on electronic device 202 is a web browser, the request for content can be a request for content from a webpage. In another example, if the application running on electronic device 202 is a video playback application, the indication of user input can be a touch (e.g., a touch in the middle of a touchscreen).

In response to the received header 206 and signal 208, server 204 provides content and/or instructions for interaction 210 to electronic device 202, and electronic device 202 receives this content and/or instructions. Content and/or instructions for interaction 210 are for the application running on electronic device 202. If content is provided for the application, the content is based on the type of server content identified by the content mode. Using the above example of a web browser running on electronic device 202, server 204 provides web content specific to the content mode (e.g., child mode) for the web browser.

The providing of specific web content occur in different manners. For example, in a child mode, all links with any objectionable material can be filtered for a child user. Alternatively, or in addition, links with objectionable material (e.g., video links) can be provided to a child user, and server 204 can filter out (e.g., skip) those portions of content (e.g., sections of a video) deemed to be objectionable.

If instructions for interaction (e.g., for element 210) are provided for the application, the instructions are based on the type of user interaction identified by the user interaction mode. Using the above example of a video playback application running on electronic device 202, based on a touch in the middle of a touchscreen, server 204 provides instructions for pausing video playback if the user interaction mode indicates a non-child mode, and provides instructions for continuing video playback and refraining from pausing if the user interaction mode indicates a child mode.

In example aspects, if the server 204 (e.g., hosting website or server-side application) does not support different modes (e.g., does not receive and interpret headers), there will be no change in behavior for the application on electronic device 202. However, if server 204 chooses to support or otherwise enables the handling of different modes, server 204 can provide content and/or instructions for interaction accordingly.

Thus, the subject technology as described herein provides cross-platform modes for adjusting content and/or user interaction features for applications on electronic devices. Furthermore, the subject technology can assist servers hosting websites or other online applications to target content toward an intended audience, and to determine an ideal audience for particular content (e.g., video content). Moreover, the subject technology can be used by users to self-specify a demographic, which can help them receive targeted content.

Although certain examples provided herein describe a user's information being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely a server). In example aspects, the user information does not include and/or share the specific identification of the user (e.g., the user's name) unless otherwise specifically provided or directed by the user.

Figure 3:
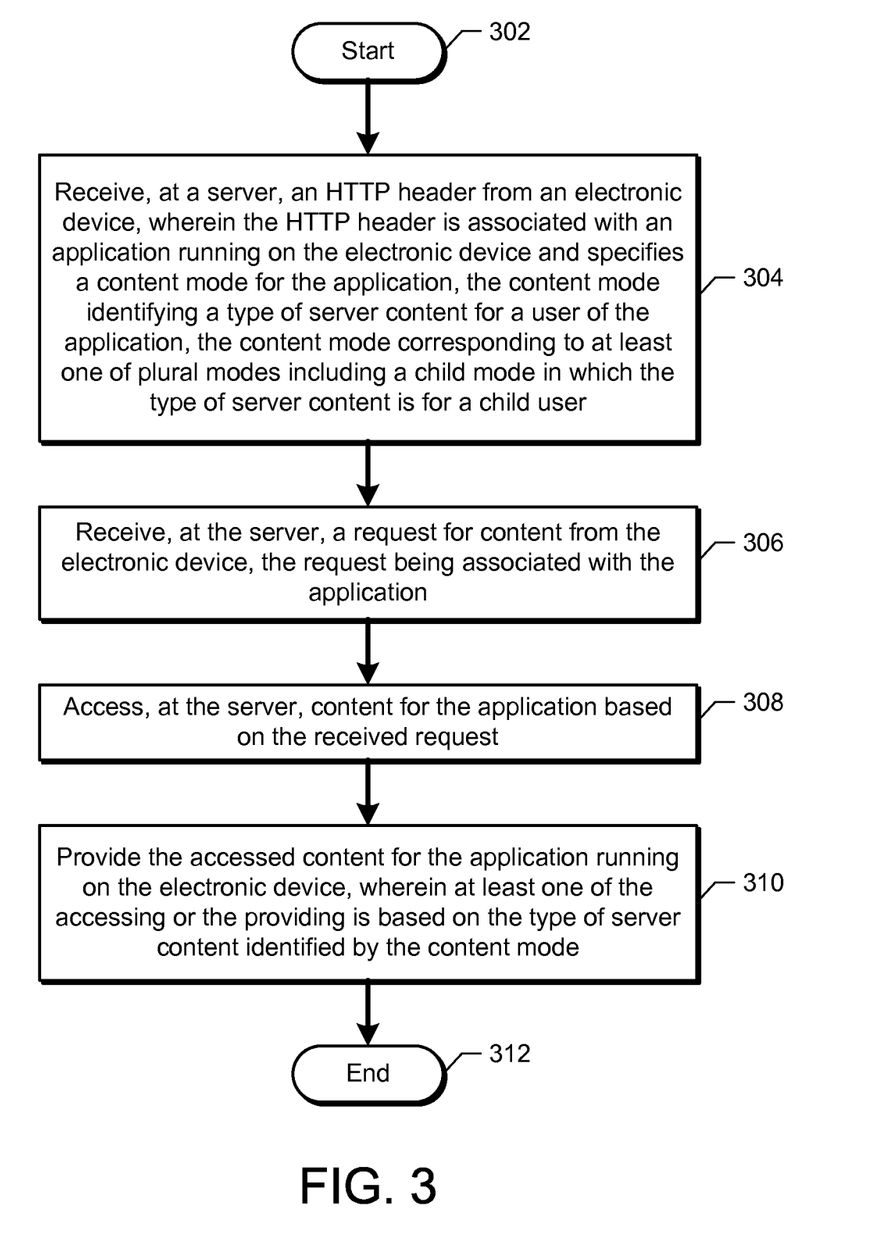
FIG. 3 illustrates an example process by which data associated with an application running on an electronic device is processed on a server.

FIG. 3 illustrates an example process by which data associated with an application running on an electronic device is processed on a server. The application can be at least one of a web browser, a client-side application, or an operating system running on the electronic device.

Following start block 302, the server receives an HTTP header from the electronic device at step 304. The HTTP header is associated with an application running on the electronic device and specifies a content mode for the application. The content mode identifies a type of server content for a user of the application, and corresponds to at least one of plural modes including a child mode in which the type of server content is for a child user.

The content mode can correspond to a user-specified value on the electronic device. Alternatively, or in addition, the content mode can correspond to an automatically detected value, based on user interaction on the electronic device.

The plural modes can further include one or more age groups. The one or more age groups can include a non-child mode in which the type of server content is for a non-child user. Alternatively, or in addition, the plural modes can further include one or more interest groups.

The HTTP header can be a type of header which is defined to specify one or more content modes. Alternatively, or in addition, the HTTP header can be a type of header which is modified to indicate one or more content modes.

At step 306, the server receives a request for content from the electronic device, the request being associated with the application. At step 308, the server accesses content for the application based on the received request. At step 310, the accessed content is provided for the application running on the electronic device. At least one of the accessing or the providing is based on the type of server content identified by the content mode.

For example, The accessing can include accessing content which is limited to the type of server content identified by the content mode for the application. Alternatively, or in addition, the accessing can include accessing general content based on the received request, and the providing can include filtering the general content to be specific to the type of server content identified by the content mode for the application. The process then ends at end block 312.

Figure 4:
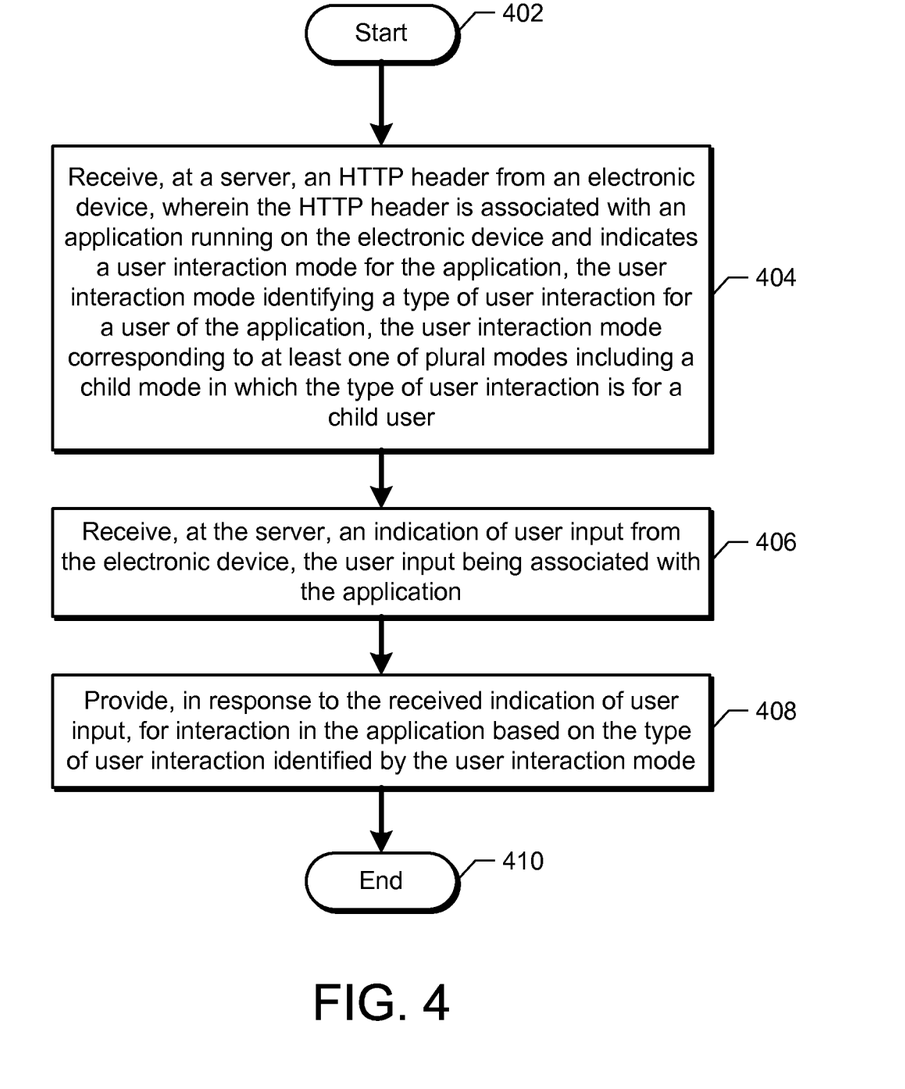
FIG. 4 illustrates another example process by which data associated with an application running on an electronic device is processed on a server.

FIG. 4 illustrates another example process by which data associated with an application running on an electronic device is processed on a server. Following start block 402, the server receives an HTTP header from an electronic device at step 404. The HTTP header is associated with an application running on the electronic device and indicates a user interaction mode for the application. The user interaction mode identifies a type of user interaction for a user of the application, and corresponds to at least one of plural modes including a child mode in which the type of user interaction is for a child user.

The content mode can correspond to a user-specified value on the electronic device. Alternatively, or in addition, the content mode can correspond to an automatically detected value, based on user interaction on the electronic device.

The plural modes can further include one or more age groups. The one or more age groups can include a non-child mode in which the type of user interaction is for a non-child user. The plural modes can further include one or more interest groups.

The HTTP header can be a type of header which is defined to specify one or more content modes. Alternatively, or in addition, the HTTP header can be type of header which is modified to indicate one or more content modes.

At step 406, the server receives an indication of user input from the electronic device, the user input being associated with the application. At step 408, in response to the received indication of user input, interaction is provided for in the application based on the type of user interaction identified by the user interaction mode. The process then ends at end block 410.

Figure 5:
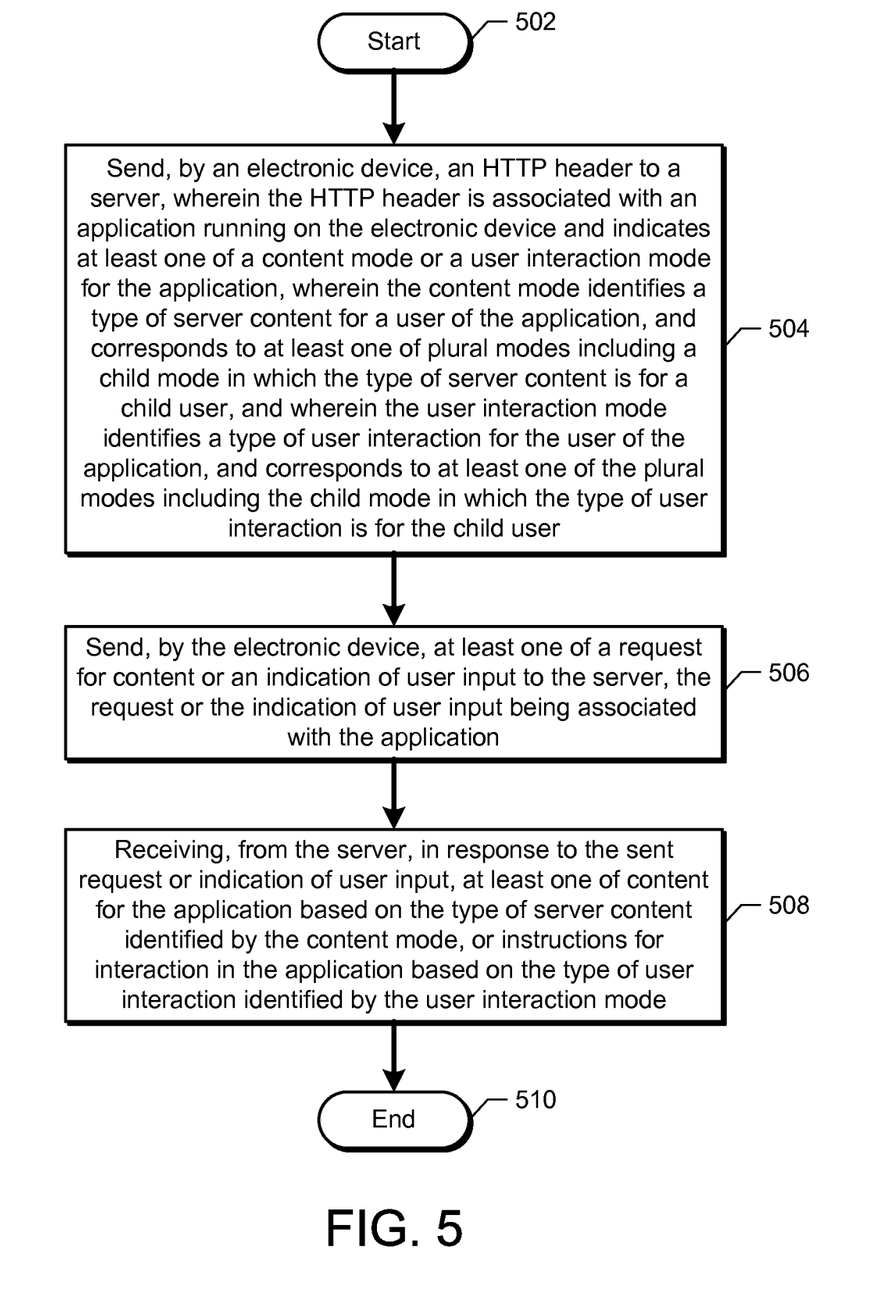
FIG. 5 illustrates another example process by which data associated with an application running on an electronic device is processed on the electronic device.

FIG. 5 illustrates another example process by which data associated with an application running on an electronic device is processed on the electronic device. Following start block 502, the electronic device sends an HTTP header to a server at step 504.

The HTTP header is associated with an application running on the electronic device and indicates at least one of a content mode or a user interaction mode for the application. The content mode identifies a type of server content for a user of the application, and corresponds to at least one of plural modes including a child mode in which the type of server content is for a child user. The user interaction mode identifies a type of user interaction for the user of the application, and corresponds to at least one of the plural modes including the child mode in which the type of user interaction is for the child user.

At step 506, the electronic device sends at least one of a request for content or an indication of user input to the server, the request or the indication of user input being associated with the application. At step 508, in response to the sent request or indication of user input, at least one of content for the application based on the type of server content identified by the content mode, or instructions for interaction in the application based on the type of user interaction identified by the user interaction mode, is received from the server.

Figure 6:
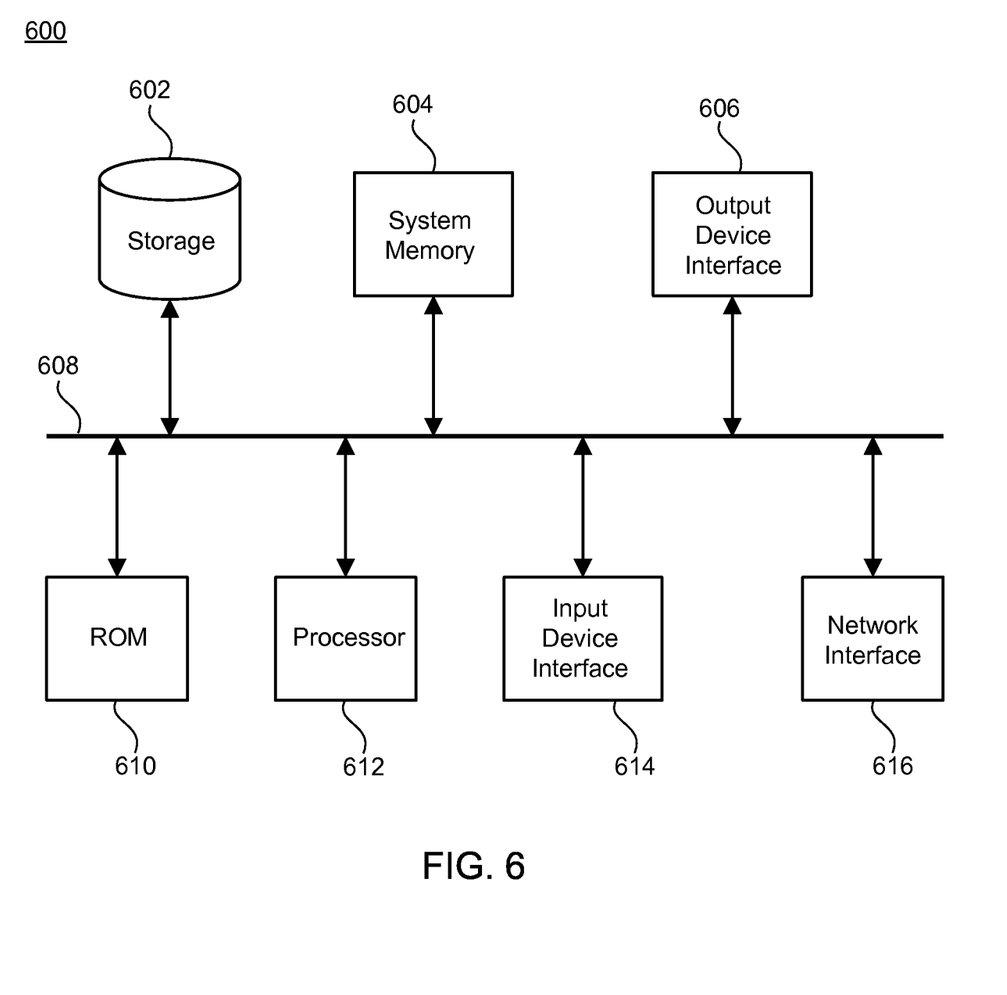
FIG. 6 conceptually illustrates an example electronic system with which some implementations of the subject technology can be implemented.

FIG. 6 conceptually illustrates an example electronic system with which some implementations of the subject technology can be implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementatons.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as a random access memory. System memory 604 stores some of the instructions and data that the processor needs at runtime. In some implementations, the processes of the subject disclosure are stored in system memory 604, permanent storage device 602, or ROM 610. For example, the various memory units include instructions for processing data associated with an application running on an electronic device in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a local area network ("LAN"), a wide area network ("WAN"), or an Intranet, or a network of networks, for example, the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method of processing data associated with an application running on an electronic device, the method comprising:
    receiving, at a server, an HTTP header generated by an electronic device,
    wherein the HTTP header is generated based on a setting within an application running on the electronic device, wherein the setting is determined based on user input associated with the application, and wherein the setting indicates a user interaction mode for the application, the user interaction mode specifying one or more user interface features to enable for a user of the application, the user interaction mode corresponding to at least one of plural modes including a child mode in which the one or more user interface features are for a child user;
    receiving, at the server, an indication of user input from the electronic device, the user input being associated with the application; and
    providing, in response to the received indication of user input, for interaction in the application based on the one or more user interface features specified by the user interaction mode,
    wherein the HTTP header is a type of header which is defined to specify one or more user interaction modes.

2. The method of claim 1, wherein the user input corresponds to user selection of the setting via a graphical interface.

3. The method of claim 1, wherein the user input corresponds to a history of user input associated with the application, and wherein the setting is determined based on the history.

4. The method of claim 1, wherein the plural modes further include one or more age groups.

5. The method of claim 4, wherein the one or more age groups include a non-child mode in which the one or more user interface features are for a non-child user.

6. The method of claim 1, wherein the plural modes further include one or more interest groups.

7. The method of claim 1, wherein the application is at least one of a web browser, a client-side application, or an operating system running on the electronic device.

8. The method of claim 1, further comprising accessing content which is limited by the user interaction mode for the application.

9. The method of claim 1, further comprising accessing general content based on the received request, and filtering the general content based on the user interaction mode for the application.

10. A system for processing data associated with an application running on an electronic device, the system comprising:
one or more processors; and
a machine-readable medium comprising instructions stored therein, which when executed by the processors, cause the processors to perform operations comprising:
receiving, at a server, an HTTP header generated by an electronic device,
wherein the HTTP header is generated based on a setting within an application running on the electronic device, wherein the setting is determined based on user input associated with the application, and wherein the setting indicates a user interaction mode for the application, the user interaction mode specifying one or more user interface features to enable for a user of the application, the user interaction mode corresponding to at least one of plural modes including a child mode in which the one or more user interface features are for a child user;
receiving, at the server, an indication of user input from the electronic device, the user input being associated with the application; and
providing, in response to the received indication of user input, for interaction in the application based on the one or more user interface features specified by the user interaction mod;
wherein the HTTP header is a type of header which is modified to indicate one or more user interaction modes.

11. The system of claim 10, wherein the user input corresponds to user selection of the setting via a graphical interface.

12. The system of claim 10, wherein the user input corresponds to a history of user input associated with the application, and wherein the setting is determined based on the history.

13. The system of claim 10, wherein the plural modes further include one or more age groups.

14. The system of claim 13, wherein the one or more age groups include a non-child mode in which the one or more user interface features are for a non-child user.

15. The system of claim 10, wherein the plural modes further include one or more interest groups.

16. A non-transitory machine-readable medium comprising instructions stored therein, which when executed by a system, cause the system to perform operations comprising:
generating, by an electronic device, an HTTP header,
wherein the HTTP header is generated based on a setting within an application running on the electronic device, wherein the setting is determined based on user input associated with the application, and wherein the setting indicates a user interaction mode for the application,
wherein the user interaction mode specifies one or more user interface features to enable for a user of the application, the user interaction mode corresponding to at least one of plural modes including a child mode in which the one or more user interface features are for a child user;
sending, by the electronic device, the HTTP header to the server;
sending, by the electronic device, an indication of user input to the server, the user input being associated with the application; and
receiving, from the server, in response to the sent indication of user input, instructions for interaction in the application based on the one or more user interface features specified by the user interaction mode,
wherein prior user interaction with the server has already occurred in association with the application, wherein the HTTP header corresponds to an AJAX call, and wherein the one or more user interface features correspond to a subsequent user interaction made in association with the application based on the AJAX call.

17. The method of claim 1, wherein prior user interaction with the server has already been loaded by the electronic device in association with the application, wherein the HTTP header corresponds to an AJAX call, and wherein the one or more user interface features correspond to a subsequent user interaction made in association with the application based on the AJAX call.

18. The system of claim 10, wherein prior user interaction with the server has already occurred in association with the application, wherein the HTTP header corresponds to an AJAX call, and wherein the one or more user interface features correspond to a subsequent user interaction made in association with the application based on the AJAX call.

* * * * *

UNITED STATES PATENT AND TRADEMARK OFFICE
CERTIFICATE OF CORRECTION

Page 1 of 1

PATENT NO. : 9,270,760 B2
APPLICATION NO. : 13/652391
DATED : February 23, 2016
INVENTOR(S) : Jonathan Adam Heinberg It is certified that error appears in the above-identified patent and that said Letters Patent is hereby corrected as shown below:

In the Claims

Column 13, Line 43 (Claim 10): Replace "mod" with --mode--

Signed and Sealed this
Twenty-third Day of July, 2019

Andrei Iancu
*Director of the United States Patent and Trademark Office*